May 5, 1959    J. TER BERG ET AL    2,885,534
ELECTRIC ARC WELDING APPARATUS
Filed Aug. 1, 1955

INVENTORS
JOSEF TER BERG
ANDRE LARIGALDIE
BY

AGENT

United States Patent Office 2,885,534
Patented May 5, 1959

2,885,534

ELECTRIC ARC WELDING APPARATUS

Jozef ter Berg and André Larigaldie, Bobigny, France, assignors, by mesne assignments, to North American Philips Company, Inc., New York, N.Y., a corporation of Delaware Application August 1, 1955, Serial No. 525,707

Claims priority, application France August 5, 1954

2 Claims. (Cl. 219—130)

The invention relates to an electric arc welding apparatus, in which an arc is struck between a metal electrode and a work piece and the electrode is displaced along the work piece.

It is common practice to use electrodes shaped in the form of short rods coated with a slag-producing envelope, but this has the disadvantages that only a comparatively small quantity of welding metal is melted down per unit time, and that the welding operation must be repeatedly interrupted.

As an alternative, a welding wire may be melted down, whilst the arm is maintained in an inert gas atmosphere or the end of the welding wire may be surrounded by a slag-producing powder covering the welding areas on the work piece. However, such methods can be carried out only with the aid of a complicated apparatus.

According to the invention the above disadvantages are obviated by using an electrode shaped in the form of a substantially circular disc which is caused to rotate about its axis during the displacement.

Owing to the rotation the metal is melted off the edge of the disc, whilst the arc remains operative substantially in the shortest distance between the electrode and the work piece.

The thickness of the disc will be chosen, in practice, of the same order as the diameter of the welding rods and welding wires employed with the conventional methods, for example 1 to 12 mms. The most suitable thickness of the disc will usually be 3 to 8 mms. While diameter of the disc is not limited, in principle, a diameter of less than 10 cms. may give rise to difficulties owing to the short distance between the axis of the disc and the work piece. Even a diameter of more than about 40 cms. may cause difficulties in the manipulation with the disc.

The disc will usually be flat, but sometimes a conical plate may be advantageous. The material of the disc may be constituted by the metals melted down in the aforesaid known methods, for example iron and iron alloys, for example corrosion-free alloys, aluminum and copper. The molten metal may be protected from atmospheric gases in the same manner as is done with the aforesaid known methods, for example by blowing an inert gas into the arc, by applying a slag-producing powder to the work piece or by applying a slag-producing coating to the sides of the disc.

The speed of rotation of the disc need not be high and it is therefore preferable to provide the disc with a coating which can be supported by the work piece during the welding operation, so that owing to the displacement of the disc along the work piece the disc is rotated. The coating melts owing to the welding and then forms a groove on the periphery of the electrode, so that the edges of the groove can bear on the work piece during the welding operation, similar to the action which occurs when welding with the touch-welding rods, in which the deep crater at the end prevents the core of the welding rod from establishing such a conductive contact with the work piece that an operative part of the welding current is allowed to pass.

When using the discs according to the invention the distance between the axis of the electrode and the work piece, which determines the length of the arc, need not be maintained by the operator or by means of a more or less complicated mechanism.

With a further preferred embodiment of the method according to the invention a magnetic field is caused to act upon the arc parallel to the axis of the electrode in order to prevent the arc from being displaced from the most operative area or extended, which might give rise to such a non-circular shape of the electrode that difficulties arise during the welding operation.

To this end use may be made of two opposite magnetic fields parallel to one another and to the axis of the electrode, one of which is shifted in place relatively to the other in the direction of movement of the electrode, the fields being maintained one on each side of the arc.

Between these magnetic fields is then produced a field which has a strength of substantially zero, and to which the arc is limited.

The method according to the invention may be carried out automatically in a simple manner, if use is made of an apparatus shaped in the form of a carriage, to which the electrode is secured so as to be rotatable about its axis and displaceable in a direction at right angles to the surface on which the carriage moves.

In order to fix the arc a horseshoe magnet may be arranged with its poles one on each side of the electrode in the proximity of the arc. As an alternative, use may be made of two magnets of this kind in a manner such as the two poles on one side of the electrtode are opposite poles. Alternatively we may use two magnets, one on each side of the electrode, the poles of one magnet being opposite the poles of the magnet on the other soide.

The accompanying drawing shows a few embodiments of the apparatus for carrying out the method according to the invention.

Figures 1, 2:
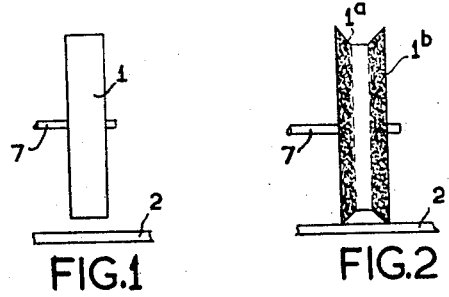
Figs. 1 and 2 show in a front view two shapes of the electrode.

The electrode shown in a front view in Fig. 1 consists of a homogeneous metal disc 1, seated on a shaft 7 and held over a work piece 2. When using this electrode, the molten metal is protected from the reaction of the air by blowing an inert gas into the arc or by applying a slag-producing powder to the work piece 2. The arc length is adjusted either by the operator or by means of a device employed also in automatic welding of wire and provided, for example, with an electronic control adjusting the arc length by means of the arc voltage.

Fig. 2 shows an electrode 1a in the form of a metal disc, also seated on a shaft 7 and coated on both sides by a slag-producing layer 1b in a manner such that a groove is formed at the periphery, the disc being supported by the workpiece 2 at the edges of the groove.

Figure 3:
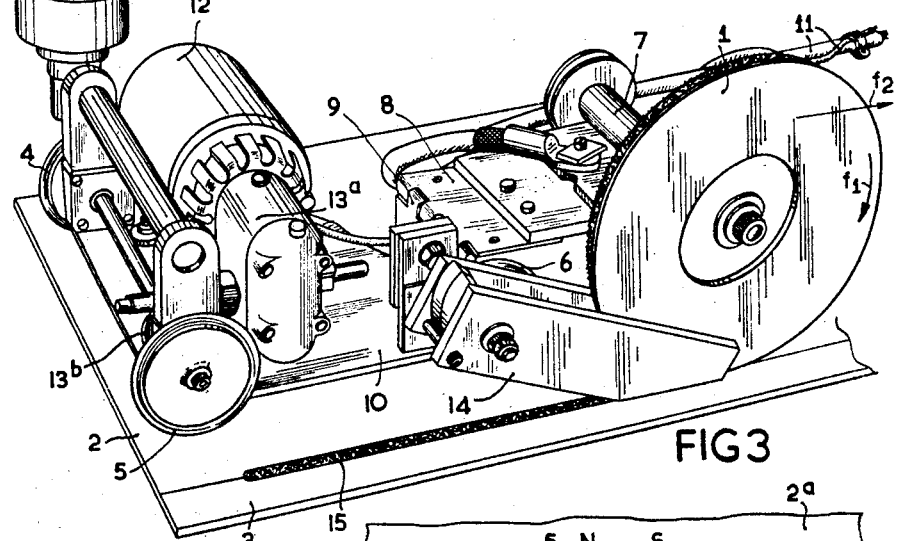
Fig. 3 is a view of a welding apparatus for carrying out the invention, viewed obliquely from the top.

With the apparatus shown in Fig. 3, reference numeral 1 designates the disc-shaped electrode, shown as a flat disc. References 2 and 3 designate the parts of the work piece to be joined. The welding apparatus is supported from three wheels provided with rubber tires 4, 5 and 6 (the latter is shown in the figure only for a small part), the electrode 1 of the kind shown in Fig. 2 is supported from the part 2 of the work piece. The electrode 1 is rotatable in the direction of the arrow $f1$ about the shaft 7, which is secured to a plate 8, rotatable about a pivot 9 on the chassis part 10 supported by the wheels 4, 5 and 6. A double, flexible cable 11 supplies electric welding current to the electrode through part of the plate 8 and the shaft 7 and also to the motor 12, driving the wheels 4 and 5, through a delaying transmission 13a and 13b. A permanent magnet 14, shaped in the form of a horseshoe, produces a magnetic field parallel to the shaft 7 at the operative area of the arc. This field displaces the arc in the direction of the arrow f1 and fixes the arc at an area suitable for the welding operation. For striking the arc use may be made of a metal part, for example a metal wire, if the coating of the electrode is not conductive. This metal part is housed in the groove, so that the metal disc is connected conductively to the work piece.

After the voltage has been switched on between the electrode 1 and the work piece 2, the arc is struck and the motor 12 moves the carriage, so that the electrode 1 rotates along its circumference while the diameter gradually decreases owing to the melting down of its metal, which is left on the work piece in the form of a metal tape 15, i.e. the desired weld. A speedometer 16 permits the operator of adjusting the desired moving rate of the carriage.

If the electrode is fed by alternating current, the permanent magnet 14 may be replaced by an electro-magnet.

In a simplified embodiment the carriage is moved manually, to which end the motor is replaced by a handle. The coating of the electrode 1 is constituted by a compound similar to that of the coating of welding rods. In certain cases it may be advantageous to introduce metal powder into the coating in order to increase the quantity of slag-producing per portion of melted-down metal. Such layers provide a satisfactory support for the electrode and serve frequently to strike the arc.

Figure 4:
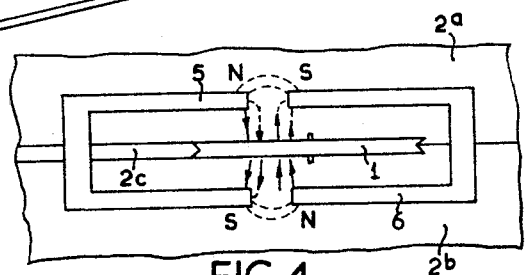
Figs. 4 and 5 show two embodiments of the apparatus with magnetic arc stabilisation.

Fig. 4 shows a device in a plan view to produce two opposite magnetic fields parallel to the shaft of the electrode. Reference numeral 1 designates the electrode; 2a and 2b designate two parts of the work piece to be joined by the weld 2c. The magnetic fields are produced by the permanent horseshoe magnets 5 and 6.

Figure 5:
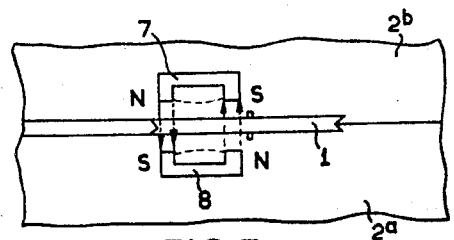

Fig. 5 shows a different arrangement of the permanent horseshoe magnets 7 and 8. The permanent magnets may be replaced by electro-magnets; in this case, the arc being fed by alternating current, phase shifts between the welding current and the current for the electro-magnets must be avoided, for example by connecting these magnets in series, part of the same current as used for the arc being passed through them.

By using the invention the welding current may be 5 to 10 times higher than the current used for welding with welding rods, while a large welding seam may be obtained without interruption.

By way of example, an electrode according to the invention shaped in the form of a metal disc of 45 cms. in diameter and of 4 mms. in thickness supplies the same quantity of welding metal as 100 welding rods of the usual length and having a core diameter of 4 mms. Therefore the invention is particularly suitable for welding long seams, for example with ships, boilers and containers.

What we claim is:

1. An apparatus for electric arc welding work pieces comprising a movable carriage, a disc-shaped electrode coated on both sides with a slag producing layer and operatively connected to said carriage whereby said electrode rotates about its axis and is displaceable in a direction substantially at right angles to the work piece surface on which said carriage moves, and a magnet positioned on each side of said electrode, the poles of one magnet arranged on one side of the electrode being opposite the poles of another magnet arranged on the opposite side of said electrode.

2. An apparatus for electric arc welding comprising a carriage adapted to be moved over a workpiece to be welded, a support, a disc-shaped electrode rotatably mounted on said support and adapted to engage the workpiece, means mounting said support on said carriage to permit movement of said electrode toward the workpiece, said electrode comprising a central disc of welding metal and outer disc-shaped layers of slag-producing material having a larger diameter than the central disc, and means mounted on said carriage to confine the welding arc to a desired location including magnets positioned on each side of the electrode.

References Cited in the file of this patent

UNITED STATES PATENTS

| | | |
|---|---|---|
| 1,298,590 | Smith | Mar. 25, 1919 |
| 1,886,524 | Chapman | Nov. 8, 1932 |
| 2,001,179 | Brugge | May 14, 1935 |
| 2,330,503 | Longoria | Sept. 28, 1943 |
| 2,526,423 | Rudorff | Oct. 17, 1950 |

FOREIGN PATENTS

| | | |
|---|---|---|
| 645,938 | Germany | June 5, 1937 |